United States Patent [19]

Genheimer et al.

[11] Patent Number: 5,216,343
[45] Date of Patent: Jun. 1, 1993

[54] MOTOR CONSTRUCTION AND METHOD FOR LIMITING SPIN-UP TIME IN A HARD DISK DRIVE

[75] Inventors: Stephen R. Genheimer, Mustang; Gary A. Treleven, Yukon; Paul F. Kusbel, Oklahoma City, all of Okla.

[73] Assignee: Seagate Technology, Inc., Scotts Valley, Calif.

[21] Appl. No.: 693,356

[22] Filed: Apr. 30, 1991

[51] Int. Cl.[5] .......................... H02P 1/16; H02P 7/12
[52] U.S. Cl. .................. 318/568.18; 318/64; 318/82; 318/94; 318/122; 318/724; 318/785; 318/431; 318/501; 318/502
[58] Field of Search .................... 318/568.17, 685, 122, 318/778, 779, 785, 61, 64, 80, 82, 83, 94, 95, 136, 724, 785, 431, 501, 502, 568.18

[56] References Cited

U.S. PATENT DOCUMENTS

| 3,651,368 | 3/1972 | Hanada | 318/254 |
|---|---|---|---|
| 3,930,190 | 12/1975 | Liska | 318/254 |
| 3,931,553 | 1/1976 | Stich et al. | 318/138 |
| 4,107,583 | 8/1978 | Hautman | 318/724 X |
| 4,401,933 | 8/1983 | Davy et al. | 318/778 |
| 4,528,485 | 7/1985 | Boyd, Jr. | 318/138 |
| 4,642,536 | 2/1987 | Boyd, Jr. et al. | 318/254 |
| 4,654,566 | 3/1987 | Erdman | 318/254 |
| 4,678,972 | 7/1987 | Lehnhoff et al. | 318/254 |
| 4,835,448 | 5/1989 | Dishner et al. | 318/254 |
| 4,906,060 | 3/1990 | Claude | 318/502 X |

FOREIGN PATENT DOCUMENTS 2102222 1/1983 United Kingdom .

Primary Examiner—Paul Ip
Assistant Examiner—Brian Sircus
Attorney, Agent, or Firm—Edward P. Heller, III; Bill D. McCarthy; Louis W. Watson

[57] ABSTRACT

A hard disk drive having a plurality of disks mounted on the rotor of a current limited, electronically commutated dc motor. Windings on the stator of the motor are divided into serially connected run and start sections and first and seconds drive circuits are provided to operate the motor by alternatively enabling the first drive circuit to pass currents serially through the two sections of the winding and enabling the second drive circuit to pass currents through only the run sections of the windings. During spin up of the disk drive to operating speed, the first drive circuit is enabled and the second drive circuit is disabled to drive the disks to the speed at which the back emf limits on the acceleration of the motor using both sections of the windings reduces the acceleration to the maximum acceleration achievable at the current limit using the run sections alone. Spin up is then completed by enabling the second drive circuit and disabling the first drive circuit.

10 Claims, 8 Drawing Sheets

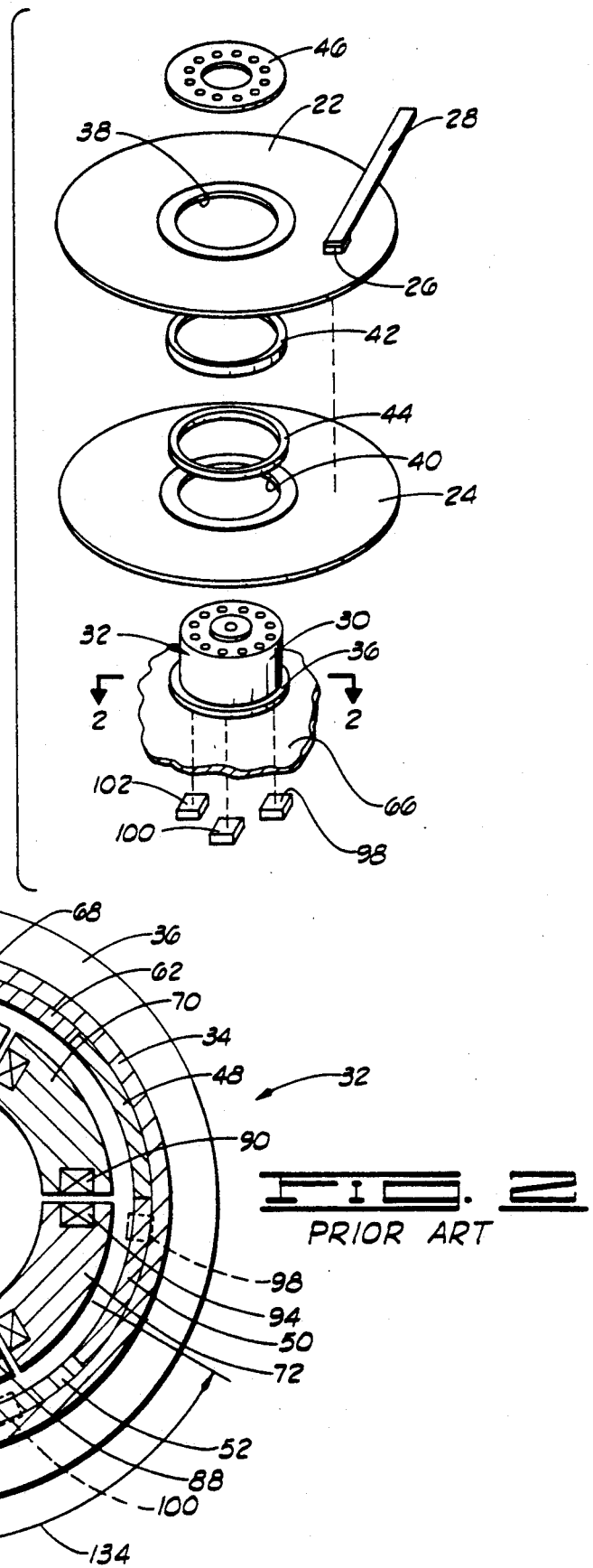

MOTOR CONSTRUCTION AND METHOD FOR LIMITING SPIN-UP TIME IN A HARD DISK DRIVE

FIELD OF THE INVENTION

The present invention relates generally to improvements in the construction and operation of hard disk drives, and more particularly, but not by way of limitation, to apparatus and methods for minimizing the time required for accelerating disks of a hard disk drive to an operating speed at which data is written to and read from the disks.

BRIEF DESCRIPTION OF THE PRIOR ART

Hard disk drives, also known as Winchester drives, have become increasingly popular in recent times as long term data storage devices to be used with digital computers. Such drives include a plurality of aluminum disks having magnetizable coatings to which data can be written by magnetizing successive data cells defined along concentric data tracks of the disks. Because of the rigidity of the aluminum substrate, the further inclusion of a servo system which is capable of precise track following permits the data tracks to be very closely spaced so that a hard disk drive can store a very large amount of data in a very small volume of space that can be afforded within the housing of a small computer. Because of these characteristics, a hard disk drive is often the ideal data storage device for a small computer system.

With the advance of computer science, another characteristic of the hard disk drive has become increasingly important to users of computers; specifically, the so-called "overhead" of the drive. This overhead includes the time that is used by the disk drive to service its own internal operations and is time during which the drive is unavailable to a computer, with which it may be used, to carry out its functions of storing data supplied by the computer and returning previously stored data to the computer. As will be recognized to those skilled in the art, it is desirable that this time be made as small as possible and one approach to limitation of overhead has been to increase the operating speed of the disks so that, once a read/write transducer used in the storage and of data has been moved to a data track to which data is to be written or from which data is be read, the time required for a sector at which the data is stored to reach the transducer head is minimized.

The implementation of this approach has given rise to a problem related to additional requirements placed on the disk drive by computers with which they are used; specifically, power to operate the disk drive is supplied by the computer so that voltage and current demands of the disk drive must meet specifications that are imposed by the computer power supply capabilities. In a typical hard disk drive, the disks are rotated by an electronically commutated dc motor that has a stator, mounted on the case of the drive, and a rotor, rotatably mounted on the stator, which supports the disks. The stator includes a plurality of windings and drive circuitry that commutates selected windings in relation to rotor orientation and the maximum speed that the rotor can attain is determined by the voltage supplied by the host computer and the number of turns of the stator windings. More particularly, at the voltage supplied to the disk drive the maximum speed the motor can attain is a decreasing function of the number of turns on the winding. Thus, high disk speeds generally correspond to the stator windings with a relatively small number of turns.

However, limiting the number of turns of the windings to achieve high disk speed can cause the motor to draw currents that exceed limitations imposed by the computer with which the disk drive is used while the disks are spun up to operating speed. At low speeds, the current through the windings, unless limited, is determined by the resistances of the stator windings and such resistances are inversely proportional to the number of turns. Limitation of the current, on the other hand, results in a low acceleration of the rotor to operating speed so that the time required to spin up the rotor, and the disks, to operating speed; that is, the overhead, is increased. Generally, then, the hard disk drive manufacturer has heretofore faced a Hobson's choice. While he can, with suitable circuitry to limit the stator current of the disk rotation motor, increase the operating speed of the motor and therefore the rotation rate of the disks, the price he has had to pay is an increase in the time required to spin the disks up to operating speed.

SUMMARY OF THE INVENTION

The present invention provides a hard disk drive and a method for operating the drive during disk spin up that enables the drive to attain high disk operating speed while drawing a limited current and to achieve these results with a minimum spin up time. Moreover, the invention can be simply and inexpensively implemented in hard disk drives by making maximum use of circuitry that is commonly found in conventional hard disk drives.

In one aspect of the invention, the hard disk drive of the present invention is comprised of an electronically commutated dc motor in which the stator windings are each divided into serially connected start and run sections that are both accessible to a drive circuit that is connected to the windings so that current can be passed either serially through both sections of the windings, in a first mode of operation of the drive circuit, or through only the run sections in a second mode of operation of the drive circuit. The construction of the drive circuit is such that the mode of operation of the drive circuit is determined by a mode selection signal supplied thereto by a mode selection circuit that is electrically connected to rotor position sensors used to provide rotor position signals to the drive circuit for stator winding commutation purposes. The mode selection circuit is constructed to determine the rotor speed during spin up and to provide a first mode selection signal to the drive circuit, causing the drive circuit to operate in the first mode during an initial stage of the spin up of the disks, and to a second mode selection signal, causing the drive circuit to operate in the second mode during a final stage of spin up.

In a second aspect of the invention, the transition from the initial stage to the final stage is selected such that the acceleration of the motor during spin up is maximized in both stages to minimize the spin up time. The acceleration of a current limited dc motor using windings with single sections is generally limited by the available current at low speeds and is limited by back emf induced in the motor windings at high speeds. Thus, a plot of acceleration against rotation rate will exhibit a substantially constant acceleration for low speeds and a steadily decreasing acceleration at high speeds. Moreover, such plots for different numbers of turns of the windings will intersect; more specifically, the acceleration will be larger for windings with a greater number of turns at low speed and the acceleration will be larger for windings with a fewer numbers of turns at high speeds. In the second aspect of the invention, the previously measured velocity at which the acceleration for serial energization of the start and run windings decreases to the acceleration for the run windings alone at the maximum allowable current is selected as the velocity at which the transition from the first mode of operation of the drive circuit to the second mode of operation is effected. Thus, the acceleration of the rotor is maximized to achieve a minimum spin up time.

An important object of the present invention is to minimize spin up time of disks of a hard disk drive.

Another object of the invention is to provide a hard disk drive motor that can be readily adapted to the minimization of spin up time in hard disk drives.

Still a further object of the invention is to provide a method for operating current limited dc motors found in hard disk drives to minimize disk spin up time.

Other objects, features and advantages of the present invention will become apparent from the following detailed description when read in conjunction with the drawings and appended claims.

BRIEF DESCRIPTION OF THE DRAWINGS

FIG. 1 is a fragmentary, exploded, perspective view of a conventional hard disk drive.

FIG. 2 is a cross section taken along line 2—2 of FIG. 1.

FIG. 6 is a schematic diagram for winding selector circuit of FIG. 3.

DETAILED DESCRIPTION OF THE PRIOR ART

Figure 3:
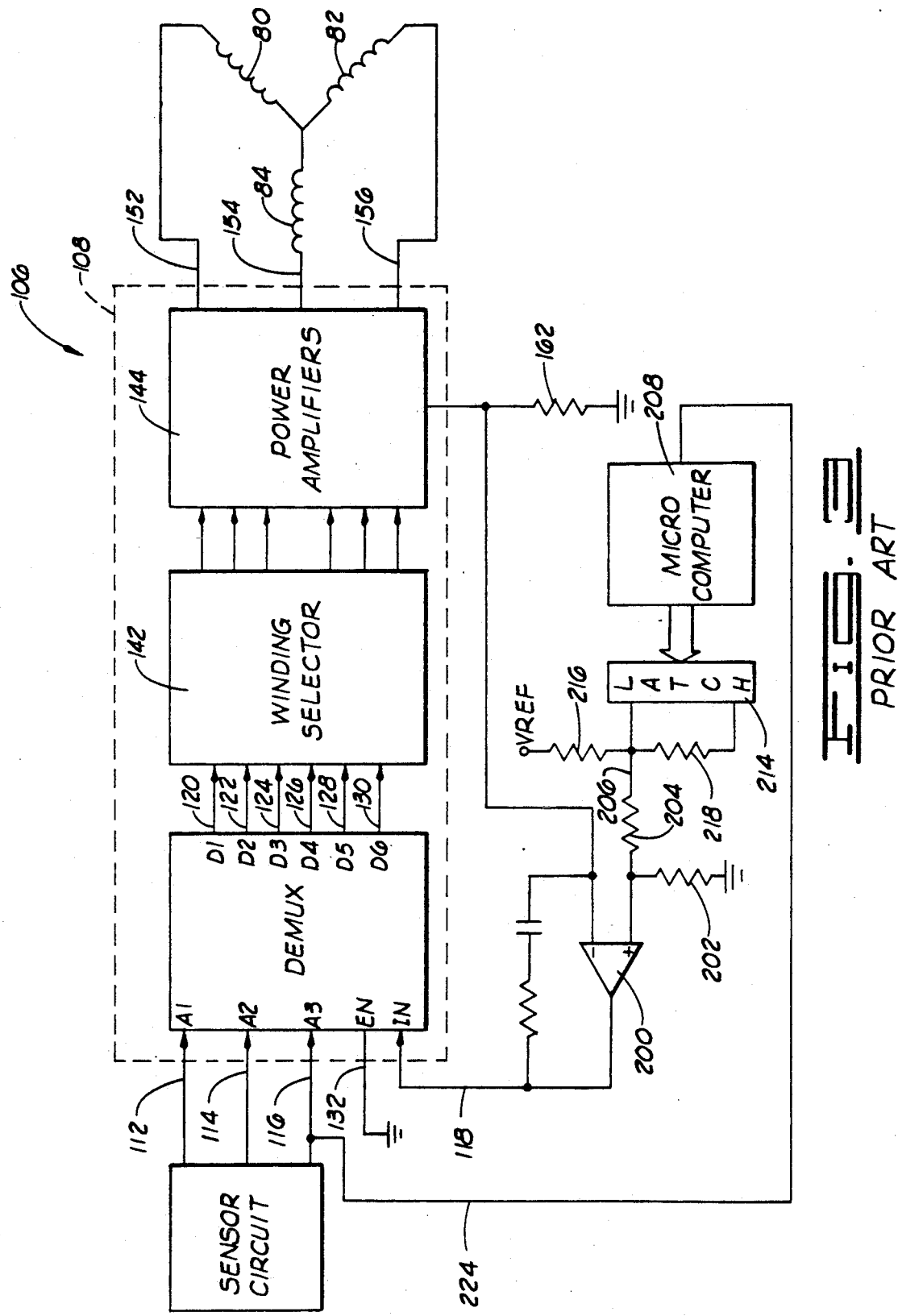
FIG. 3 is a schematic diagram of the motor circuit of the hard disk drive of FIG. 1.

As has been noted above, the present invention can be implemented in a manner that makes maximum use of circuitry found in conventional hard disk drives with the result that the implementation of the invention can be rapidly and inexpensively effected. More particularly, such implementation is an advantage that has been fully exploited in one embodiment of the invention that will be discussed below with respect to FIGS. 8 and 9. Accordingly, it will be useful prior to describing the invention to set the stage for such description by considering the construction and operation during spin up of a prior art hard disk drive. FIGS. 1 through 7 have been provided for this purpose.

Referring first to FIG. 1, a hard disk drive, generally designated by the reference numeral 20, is typically comprised of a plurality of aluminum disks, two of which have been shown in FIG. 1 and designated 22 and 24 therein, that have magnetizable surface coatings. Thus, when the disks are rotated about their axes, data can be written to the disks or read therefrom by transducer heads that are positioned adjacent their surfaces in the manner shown for the disk 22 and a transducer head 26. The transducer heads are mounted on support arms, such as the support arm 28, carried by an actuator (not shown) that moves the arms to radially position the transducer heads above concentric data tracks (not shown) defined on the disks. Conventionally, servo data is written to one or more tracks to be read by one of the transducers to provide positioning information to a servo system (not shown) that is used in the positioning of the actuator.

Support for the disks 22, 24 in the hard disk drive 20 is provided by the rotor 30 of an electrically commutated, polyphase dc motor 32 so that the motor 32 can be used to provide the rotation of the disks 22, 24 necessary for the writing and subsequent reading of data. As shown in FIG. 2, the rotor 30 is comprised of a shell 34 (not numerically designated in FIG. 1) having a flange 36 formed at the lower end thereof so that the disks can be mounted on the rotor 32 as indicated in FIG. 1. Specifically, central holes 38 and 40, sized to slip on upper portions of the shell 34, are formed through the disks 22 and 24 respectively and the disks are supported in a spaced relation on the flange 36 by spacers, two of which have been indicated at 42 and 44, and clamped to the rotor 32 by a plate 46. The plate 46 is positioned atop the uppermost disk 22 and is provided with a plurality of holes (not numerically designated in the drawings) that align with a plurality of threaded holes (not numerically designated in the drawings) in the top of the rotor 22. The plate 46 is secured to the rotor 32 via bolts (not shown) that extend through the holes in the plate 46 and screw into the holes in the top of the rotor 32.

Referring to FIG. 2, the rotor is further comprised of a plurality of permanent magnets 48, 50, 52, 54, 56, 58, 60 and 62 attached to the inner wall of the shell to extend in a ring about a stator 64. The stator 64 is mounted on the case, partially illustrated at 66 in FIG. 1, of the hard disk drive 20 and bearings (not shown) between the shell 34 and the stator 64 rotatably support the rotor 32 on the stator 64. As shown in FIG. 2, the stator 64 is comprised of a plurality of stator sections 68, 70, 72, 74, 76, and 78 which carry windings 80, 82 and 84 shown in FIG. 3 (the windings have not been generally designated in FIG. 2.). In a three phase motor which, for purposes of providing a concrete example, has been illustrated in the drawings, portions of each winding are wrapped on opposing stator sections. For example, the winding 80 has portions 86 and 88 wrapped on stator sections 68 and 74 respectively; the winding 82 has portions 90 and 92 wrapped on stator sections 70 and 76 respectively; and winding 84 has portions 94 and 96 wrapped on stator sections 72 and 78 respectively. Hall elements 98, 100 and 102, forming portions of a sensor circuit 104 (FIG. 3) are positioned in proximity to the ring of magnets 48–62, as shown in FIG. 2, and the magnets 48–62 are radially magnetized, with alternate magnets magnetized in opposite directions, and the Hall elements will provide signals indicative of the magnetization of the magnet currently near each element and thereby provide information indicative of the orientation of the rotor 32 as will be discussed below.

Referring to FIG. 3, the hard disk drive 20 is comprised of a motor circuit 106 that includes the windings 80, 82 and 84 and the sensor circuit 104. Additionally, the motor circuit 106 is comprised of a drive circuit 108 that is electrically connected between the sensor circuit 104 and the windings 80, 82 and 84 and is comprised of a demux 110, which receives three outputs from the sensor circuit 104, corresponding to signals from the Hall elements 98, 100 and 102, via conducting paths 112, 114 and 116. The sensor signals are received at three address terminals of the demux 110 and are used to select a data terminal of the demux to which an input signal, received by the demux at an input terminal connected to a conducting path 118, is transmitted from the demux 110 on conducting paths 120, 122, 124, 126, 128, and 130 when the demux is placed in an enabled state by grounding an enable terminal via a conducting path 132. Power for the circuit 106 is supplied by a host computer with which the hard disk drive 20 is used and, typically, three voltage levels are supplied: ground, five volts which provides power for logic circuitry and twelve volts which provides power for analog circuitry. When the enable terminal receives a positive voltage, the conducting paths 120, 122, 124, 126, 128 and 130 are held at the ground level. A demux having these characteristics is a type 4051 eight channel analog multiplexer/demultiplexer available from Signetics Company of Sunnyvale, Calif.

Figure 4:
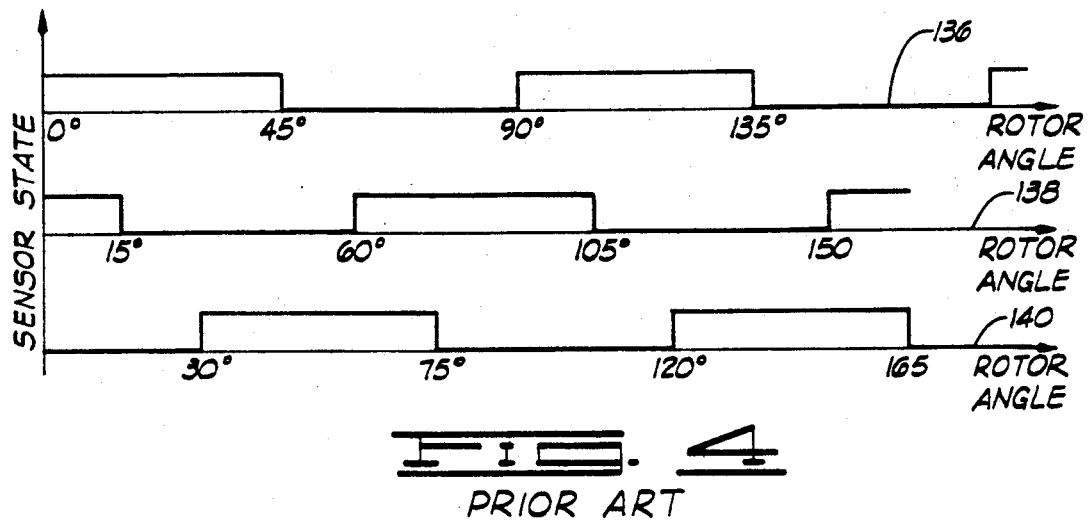
FIG. 4 is a graphical illustration of the output of the sensor circuit shown in FIG. 3.

In order for the sensor signals to serve as data terminal addresses, the sensor circuit 104 is comprised of a plurality of comparators (not shown) which transform the raw Hall element signals into square voltage pulses that are phased in relation to rotor orientation as has been shown in FIG. 4. In the three phase, eight pole motor that has been illustrated, each phase alternates between ground and a positive voltage on forty five degree intervals of the rotor angle 134 shown in FIG. 2 and the phases are shifted relative to each other by thirty degree increments. Thus, the first phase, plotted against rotor angle at 136 exhibits a high stage between zero and forty five degrees and a low, or ground, state between forty five and ninety degrees; the second phase, plotted against rotor angle at 138 exhibits a high state between sixty and one hundred five degrees and a low, or ground, state between fifteen and sixty degrees; and the third phase, plotted against rotor angle at 140 exhibits a high state between thirty and seventy five degrees and a low, or ground, state between seventy five and one hundred twenty degrees. Thus, the three phases define six three bit binary addresses, each corresponding to successive fifteen degree increments in the range of rotor angle from zero to ninety degrees, and these addresses repeat on a ninety degree interval. Thus, each of the conducting paths 120, 122, 124, 126, 128 and 130 will be high for one fifteen degree increment during each ninety degrees of rotation of the rotor 32. (As will be recognized by those skilled in the art, the binary addresses are determined by the placement of the Hall element 98, 100 and 102 so that phases and, consequently, addresses other than those shown in FIG. 4 may be generated by the sensor circuit 104. Phasing of the supply of electric current to the windings 80, 82 and 84 is effected by the connection of the conducting paths 120, 122, 124, 126, 128 and 130 to remaining circuitry of which the drive circuit 108 is comprised.)

Figure 5:
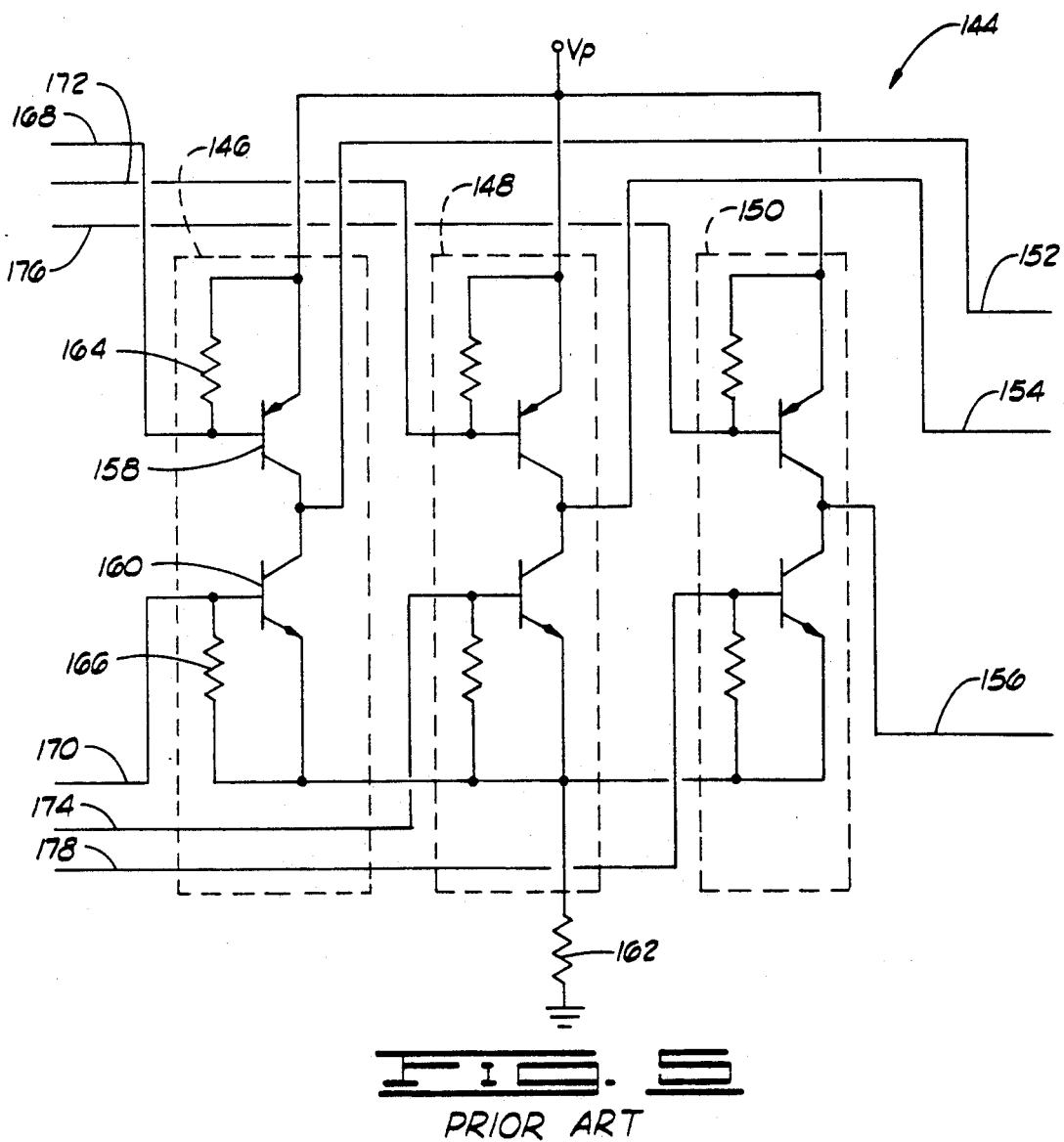
FIG. 5 is a schematic diagram for the power amplifiers circuit of FIG. 3.

In addition to the demux 110, the drive circuit 108 is comprised of a winding selector circuit 142, the construction of which has been illustrated in FIG. 6, and a power amplifiers circuit 144, the construction of which has been illustrated in FIG. 5. It will be useful to consider the power amplifiers circuit 144 first.

Referring to FIG. 5, the power amplifiers circuit 144 is comprised of three identical power amplifiers 146, 148 and 150 that are each associated with one of the windings 80, 82 and 84. More particularly, the windings 80, 82 and 84 are disposed in the conventional star arrangement and the distal end of the winding 80 is connected to the power amplifier 146 via a conducting path 152, the distal end of the winding 84 is connected to the power amplifier 148 via a conducting path 154 and the distal end of the winding 82 is connected to the power amplifier 150 via a conducting path 156. Since the power amplifiers 146, 148, and 150 are identical, it will suffice for purposes of disclosure to describe only the amplifier 146.

As shown in FIG. 5, the power amplifier 146 is comprised of a pnp transistor 158 and an npn transistor 160 connected in series across the high voltage source, indicated in the drawings as Vp, supplied by the host computer with which the hard disk drive 20 is used. More particularly, the collectors of the transistors 158 and 160 are connected together and to the winding 80 and the emitters of the transistors 158 and 160 are connected, respectively, to the high voltage supply and the circuit ground, the latter connection being made through a feedback resistor 162, so that the end of the winding 80 can be connected substantially to the high voltage supply Vp or to the system ground by appropriate signals introduced to the bases of the transistors 158 and 160. The base of transistor 158 is connected to the supply voltage Vp via a biasing resistor 164 and the base of transistor 160 is connected, via a resistor 166, to the feedback resistor 162 used to ground the emitter of the transistor 160 so that, in the absence of external signals received by the transistors 158 and 160, both will be in a nonconducting state to present a high impedance to the winding 80 and prevent current from passing through the winding 80. Alternatively, when a signal is introduced into the base of transistor 158, via conducting path 168, that will lower the potential at such base, the transistor 158 will conduct so that a current may be passed through the winding 80 in a direction from the distal end thereof to the common point of the windings and, when a signal is introduced into the base of transistor 160, via conducting path 170, that will raise the potential at such base, the transistor 160 will conduct so that a current may be passed through the winding 80 in a direction toward the distal end thereof from the common point of the windings. Similar connections are made to the bases of the corresponding transistors of the power amplifiers 148 and 150 via conducting paths 172 and 174, for the power amplifier 148, and conducting paths 176 and 178 for the power amplifier 150. Thus, a current may be passed through any selected pair of winding 80, 82, 84 and in either direction by lowering the potential on one of the conducting paths 168, 172 and 176 while raising the potential on one of the conducting paths 170, 174 and 178. The third winding will be presented with a high impedance to both the supply voltage Vp and ground so that it will not conduct.

Referring now to FIG. 6, the winding selector circuit 142 is comprised of six identical amplifiers 180, 182, 184, 186, 188 and 190 each of which receives a signal from the demux 110 on one of the conducting paths 120, 122, 124, 126, 128, and 130. Since the amplifiers 180, 182, 184, 186, 188 and 190 are identical, it will suffice for purposes of this disclosure to describe only one of these amplifiers, the amplifier 180. As can be seen in FIG. 6, the amplifier 180 is comprised of npn transistors 192 and 194 connected in the Darlington configuration with the base of transistor 192 connected to the demux 110 via the conducting path 120. A bias circuit, comprised of resistor 196 and capacitor 198, pulls down the base of transistor 192 so that, in the absence of a high potential at the demux data terminal that connects to conducting path 120, the transistors 192 and 194 will not conduct. Similar connections are made to the bases of corresponding transistors in the amplifier 182, 184, 186, 188 and 190 so that the transistors in one of the amplifiers 180, 182, 184, 186, 188 and 190 will conduct for each of the addresses supplied by the sensor circuit 104.

The conducting paths 168, 172 and 176 each lead to the collectors of the pairs of transistors of two of the amplifiers 180, 182, 184, 186, 188 and 190 and the conducting paths 170, 174 and 178 each lead to the emitters of the pairs of transistors of two of the amplifiers 180, 182, 184, 186, 188 and 190 in a conventional connection scheme that will cause conduction by the pnp transistor of one power amplifier 146, 148 or 150 and conduction by the npn transistor of another of the power amplifiers 146, 148 and 150 so that, for every fifteen degree increment of orientation of the rotor 30, a current will be passed through a selected pair of the windings 80, 82 and 84 in a direction that will magnetize four of the stator elements 68, 70, 72, 74, 76 and 78 in directions to exert a torque in a selected run direction on the rotor 32. The phasing of these currents with respect to rotor orientation is conventional so that it need not be discussed herein.

As noted above, the current drawn by the motor 32 of a hard disk drive is limited by the power that can be made available by the host computer with which the hard disk drive 20 is used. Referring once again to FIG. 3, this limitation is selectively provided by a feedback circuit (not generally designated in FIG. 3) comprised of the feedback resistor 162, a comparator 200 and a voltage divider comprised of resistors 202 and 204. The output of the comparator 200 is connected to the conducting path 118 that provides the input signal to the demux 110, the inverting input of the comparator 200 is connected to the high voltage side of the feedback resistor 162 and noninverting input of the comparator 200 is connected to the common point of the resistors 204 and 202, the other end of which is grounded, so that the motor circuit 106 is provided with a transconductance mode of operation in which the current through the windings is determined by the potential at the distal end of the resistor 204 on conducting path 206. (The feedback circuit can also include a resistor and capacitor, not numerically designated in the drawings, connected between the comparator 200 output and the inverting input to limit the bandwidth of the feedback circuit for the purpose of eliminating any tendency of the motor circuit 106 to "hunt" for the current that is to be passed through the windings.) During spin up of the rotor 30, this potential is fixed by a microcomputer 208 as will now be described with additional reference to FIG. 7 which provides a flow chart of the spin up routine for the hard disk drive 20.

When the disk drive is initially started, the microcomputer enters the spin up routine at the start block 210 and immediately outputs a binary code calling for a high current through the windings, at block 212, to a latch. One output of the latch 214 is connected to the conducting path 206 and to one end of a resistor 216. The other end of the resistor 216 is connected to the five volt power level supplied by the host computer. A resistor 218 is connected between the conducting path 206 and a second output of the latch 214 so that the potential at the conducting path 206 will be determined by the binary code outputted to the latch 214. In the block 212, the code is, in binary expression, 11 and the latch derives power from the five volt power level provided by the host computer so that the potential on the conducting path 206 during the command indicated at block 212 will be five volts. The resistors 202 and 204 are selected so that five volts on the conducting path 206 will provide an input voltage to the demux 110 that will result in the maximum allowable current to be passed through the winding 80, 82 and 84. Thus, currents will be passed through selected windings, in relation to the present orientation of the rotor 30, to give rise to the maximum torque that can be exerted on the windings.

Following energization of the motor 32, the microcomputer 208 initializes a revolution count, block 220. In the case of the three phase eight pole motor shown, the initial value is selected to be eight corresponding to the eight changes in the state of one of the sensor phases that occurs during one complete revolution of the rotor 30. A loop count, corresponding to a selected time, is then initialized to zero at block 222. As is known in the art, the transducer heads 26 "fly" on a cushion of air above the disks during operation of a hard disk drive and such flight will commence at a particular speed that is substantially the same for all hard disk drives of a generic type. The selected time for the loop count is the time required for the disks to turn through one revolution at the disk speed at which flight of the heads commences. This time is subdivided into equal loop times, to be discussed below, so that flight of the transducer heads corresponds to a particular value of the loop count.

Figure 7:
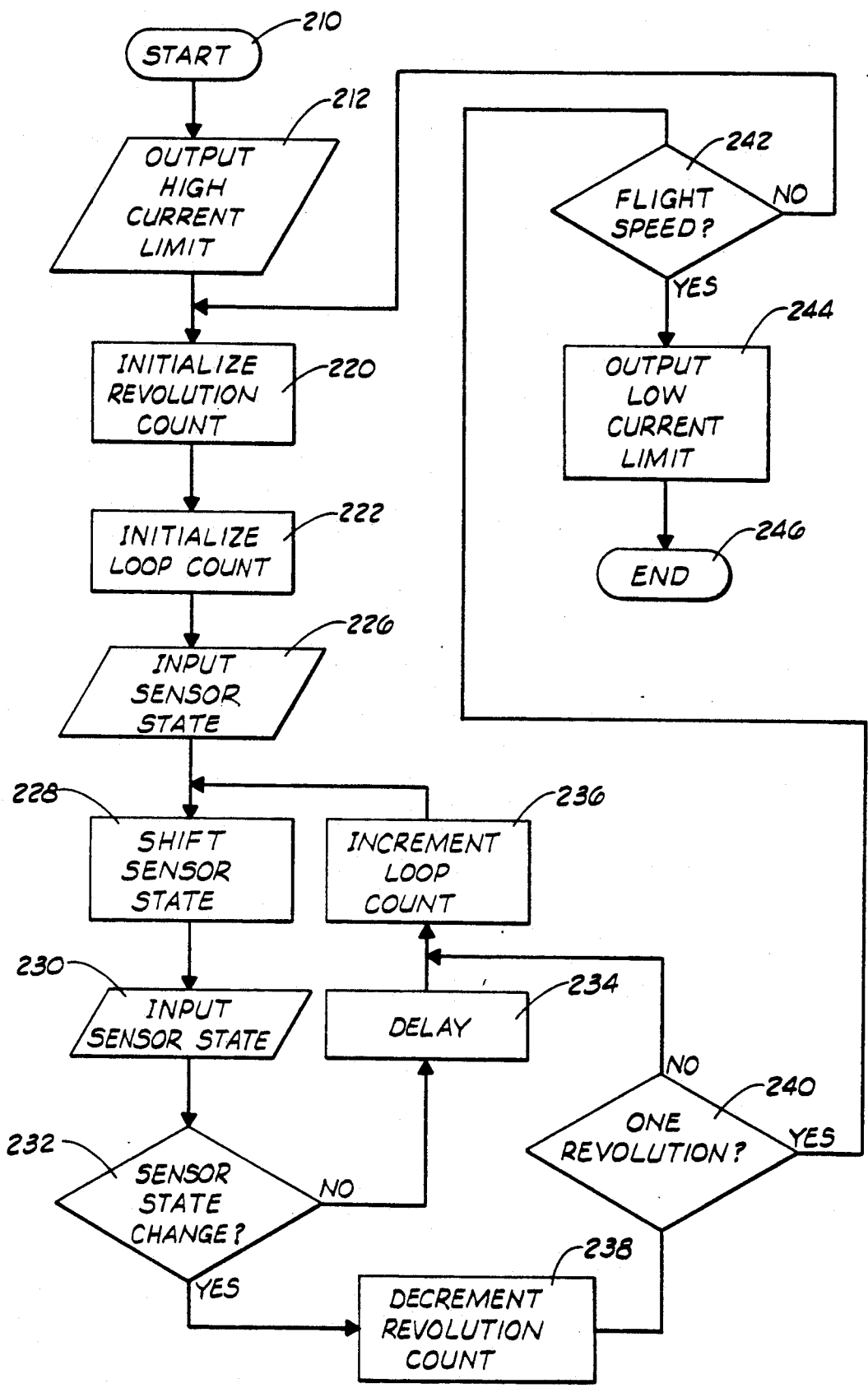
FIG. 7 is a flow chart illustrating the operation of a conventional hard disk drive during disk spin up.
Figure 8:
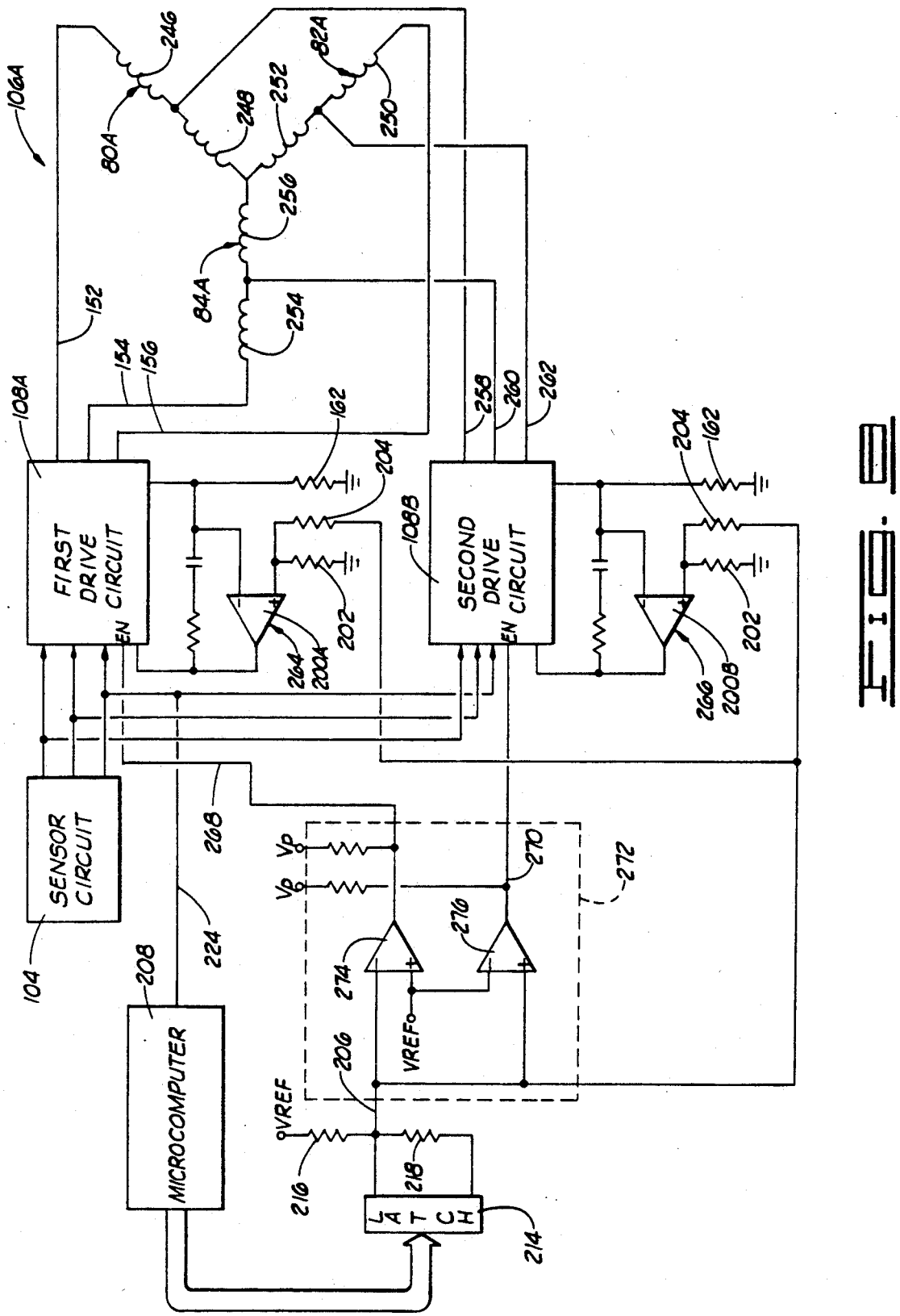

As can be seen in FIG. 3, one port of the microprocessor 208 is connected to one of the sensor circuit outputs, via a conducting path 224, and the microcomputer is programmed to input the current state of such output, block 226, following initialization of the loop count and enter a loop shown in lower portions of FIG. 7. In this loop, the current sensor state is shifted to an internal register in the microcomputer 208, at block 228, and the sensor state is again inputted at block 230. The microcomputer then compares the newly inputted sensor state to the previously inputted sensor state, at block 232, to determine whether the rotor 30 has turned sufficiently between the two input steps to result in a change in the state of the sensor circuit output being monitored. If not, the microcomputer enters a delay routine, at block 234, following which the loop count is incremented at block 236. The microcomputer program then returns to the block 228 to again input the state of the selected sensor circuit output. The loop time is the time required for the microcomputer to execute the loop comprised of the blocks 228, 230, 232, 234, and 232 so that the current loop count will correspond to the time the rotor has been rotating since initialization of the loop count.

When a sensor state change does occur, the program decrements the revolution count by one, block 238, and the register in which the revolution count is stored is then checked, at decision block 240, to determine whether such register has been decremented to zero; that is, whether the rotor 30 has turned through one revolution since the revolution count was initialized. If not, the program returns to block 236 to again increment the loop count and return to the beginning of the loop. The delay routine 234 is selected to require the same number of microcomputer clock cycles as required by the blocks 238 and 240 so that the total time required for the program to carry out a single loop, beginning and ending with the input sensor state block 228, will be the same for both paths the loop might take. Accordingly, the loop count will be a measure of the time that has elapsed since the input of the sensor state at block 228 was first carried out subsequent to initialization of the loop count.

When one revolution of the disks has occurred, the state of the sensor circuit output being monitored will have changed eight times to decrement the revolution count to zero and the loop provided by blocks 228, 230, 234, 236, 238 and 240 is exited to decision block 242 at which the speed of the rotor for the revolution is compared to the speed required for the transducer heads to fly. Such comparison is made by merely checking the loop count to determine whether such count is the number of loop times that will accumulate in one revolution at the speed at which the heads will fly. If not, the program returns to the block 220 to again initialize the revolution and loop counts for measurement of the speed of the disks for another revolution of the disks.

When the heads have reached flight speed the microcomputer calls for a lower winding current, at block 244 and ends the routine at block 246 so that spin up is completed with lower currents through the windings. Such lower currents are called for by outputting the code 10 to the latch 214 so that the lower end of resistor 218 is grounded and resistors 216 and 218 form a voltage divider that lowers the potential at the noninverting input of the comparator 200. The microcomputer then goes to another program, not shown, in which the speed is again monitored as described to determine whether the disks have reached operating speed. When this occurs, control of the motor speed is passed to a servo circuit (not shown) by switching the conducting path 206 to the servo circuit via electronic switches which, for clarity of presentation of the spin up procedure, have not been illustrated in the drawings.

The utility of the spin up procedure effected in the manner described is related to the drag exerted on the disks by the transducer heads when spin up is initiated. At this time, the heads will be in contact with the disks and they can exert an appreciable force on the disks that will result in an initial low acceleration of the disks that will increase the spin up time. The initial high current counteracts the excessive drag on the disks by the heads prior to flight of the heads.

DESCRIPTION OF THE PREFERRED EMBODIMENT

With this introduction, the preferred embodiment of the present invention can now be discussed. As noted above, the invention makes maximum use of circuitry found in the prior art hard disk drive that has been described above and such use will be indicated in FIGS. 8 though 10, in which two embodiments of the hard disk drive of the present invention will be described, by using the same numerical designations for circuit elements of the hard disk drive of such embodiments that have been used for corresponding elements in the prior art disk drive.

Figure 8:
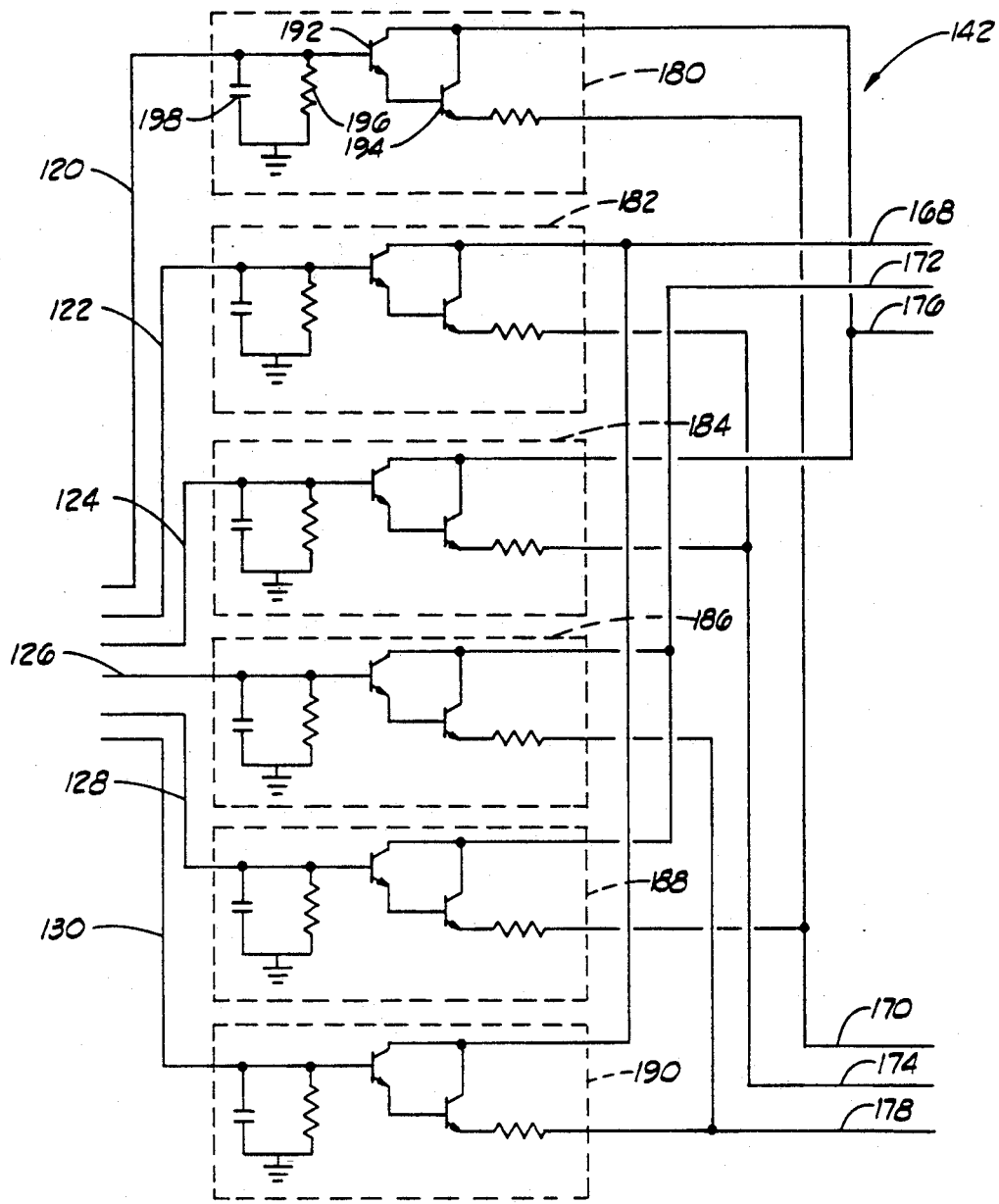
FIG. 8 is a schematic diagram of the motor circuit of a hard disk drive constructed in accordance with the present invention.

Referring to FIG. 8, in the preferred embodiment of the hard disk drive of the present invention, the mechanical structure of the drive is, with one exception, identical to the structure described above with respect to FIGS. 1 and 2. The exception, shown in FIG. 8 wherein is illustrated the motor circuit 106A for a hard disk drive constructed in accordance with present invention, is that the motor windings, designated 80A, 82A and 84A, are divided into serially connected start and run sections, 246 and 248 respectively for the winding 80A, 250 and 252 respectively for the winding 82A and 254 and 256 respectively for the winding 84A. The run sections 248, 252 and 256 are connected together to provide the star configuration for the windings and the distal ends of the start sections are connected to the conducting paths 152, 154 and 156 as in the motor circuit 106. The junctions between the sections of the windings are made accessible by connections to conducting paths 258, 260 and 262, corresponding to the conducting paths 152, 154 and 156 respectively, so that the motor of the hard disk drive of the present invention can be operated by passing currents serially through both sections of each of the windings 80A, 82A, and 84A, via conducting paths 152, 154 and 156 or operated by passing currents through only the run sections of the windings via conducting paths 258, 260 and 262.

In the practice of the present invention, the motor circuit 106A is provided with two drive circuits that are both identical to the drive circuit 108 shown in FIG. 3. More particularly, the motor circuit 106A is comprised of a first drive circuit 108A that is connected to the windings 80A, 82A and 84A via the conducting paths 152, 154 and 156 and a second drive circuit 108B that is connected to the windings via the conductors 258, 260 and 262. Each of the drive circuits 108A and 108B is connected to the sensor circuit in the same manner that the drive circuit 108 is connected to the sensor circuit in the prior art motor circuit 106 shown in FIG. 3. Thus, the hard disk drive of the present invention can be operated by passing currents serially through the start and run sections of the windings 80A, 82A and 84A using the first drive circuit 108A or operated by passing currents through only the run sections of the windings using the second drive circuit 108B.

In the practice of the invention, the motor circuit 106A is provided with two feedback circuits, indicated at 264 and 266, having the same form as the feedback circuit of the prior art hard disk drive described above and differing from each other only in the magnitudes of the resistors forming the voltage divided to which the noninverting inputs of the comparators, 200A and 200B, are connected for a purpose to be discussed below.

As in the motor circuit 106, the motor circuit 106A is comprised of the microprocessor 208, connected to the sensor circuit as has been described above, the latch 214 and the resistors 216 and 218 connected to the latch 214 as has been previously described.

The present invention contemplates that the motor circuit 106A will be operated in a first mode wherein the first drive circuit 108A is enabled by a first mode selection signal delivered to an enable terminal of the first drive circuit 108A on a conducting path 268 and in a second mode wherein the second drive circuit is enabled by a second mode selection signal delivered to an enable terminal of the second drive circuit on a conducting path 270. Such signals, which are effected by grounding the enable terminals of the demuxes of the drive circuits 108A and 108B, are provided by a mode selection circuit 272 that is connected to the conducting path 206 that provides signals from the latch 214 to the voltages dividers of the feedback circuits 264 and 266 formed by the resistor pairs 202 and 204. In the motor circuit 106A of the preferred embodiment, the mode selection circuit 272 is comprised of two comparators 274 and 276, with the inverting input of the comparator 274 and the noninverting input of the comparator 276 connected to the conducting path 206 from the latch 214 and with the noninverting input of the comparator 274 and the inverting input of the comparator 276 receiving a reference voltage that is selected to be between the voltages supplied on the conducting path 206 when the latch 214 contains the two codes 11 and 10 as described above. Thus, when the latch 214 contains the code 11, the output of the first comparator 274 will be low to enable the first drive circuit 108A and the output of the second comparator 276 will be high to disable the second drive circuit 108B. Conversely, in response to the code 10, the output of the first comparator 274 will be high to disable the first drive circuit 108A and the output of the second comparator 276 will be low to enable the second drive circuit 108B. Thus, the codes 11 and 10 in the latch 214 constitute first and second mode selection codes that can be used to select the drive circuit, 108A or 108B, used to pass current through the windings 80A, 82A and 84A. The difference in the values of the resistors 202 and 204 of the voltage dividers of the feedback circuits 264 and 266 that has been noted above is provided in the practice of the present invention to cause the feedback circuits to call for the same current through the windings in both modes of operation of the motor circuit 106A. Specifically, the resistor values are selected so that the potential at the noninverting input of the comparator 200B at such times that the latch 214 contains the code 10 will be the same as the potential at the noninverting input of the comparator 200A when the latch contains the code 11. In the practice of the invention, the current called for by the comparators 200A and 200B in these cases will be the maximum current allowable for operation of the motor windings by the host computer in which the hard disk drive of the present invention is incorporated.

Figure 11:
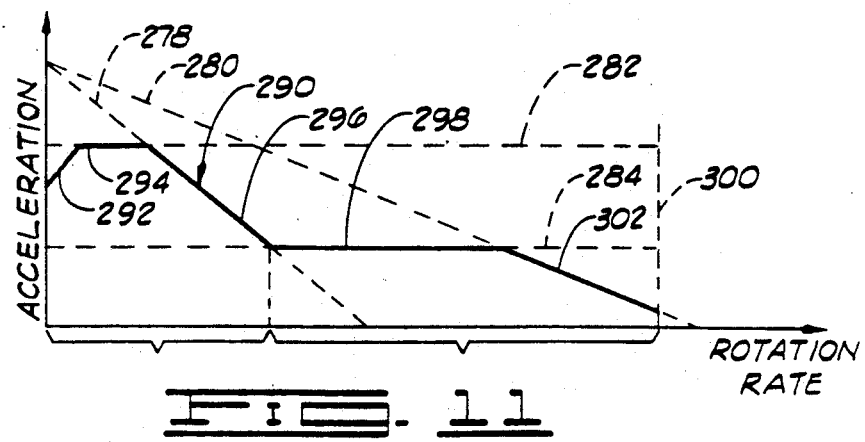
FIG. 11 is a graphical illustration of the variation of acceleration of the disks in relation to velocity in a hard disk drive constructed in accordance with the present invention.

To provide a better appreciation of the present invention, it will be useful to consider the variation of the acceleration of a typical current limited, electronically commutated dc motor with rotor speed and FIG. 11 has been included to provide a basis for discussion of such variation. As shown therein, the acceleration for a particular number of turns on the windings has a back emf limit that, for the combined start and run sections, has been indicated by the dashed line 278 and for the run winding alone has been indicated by the dashed line 280. In general, the back emf limited acceleration curves have a maximum value that depends upon the voltage applied to the windings but is the same for any number of turns on the windings. The acceleration for both curves decrease to zero at rotor speeds that are dependent upon the number of turns on the windings. Thus, the greater the number of windings, the lower the speed the rotor can attain. Accordingly, the dashed line 278 corresponds to back emf limited operation of the motor of the present invention for the case in which currents are passed serially through the start and run sections of the windings 80A, 82A and 84A and the dashed line 280 corresponds to back emf limited operation of the motor of the present invention for the case in which currents are passed through only the run sections of the windings 80A, 82A and 84A.

When the winding currents are limited by the drive circuit used to pass currents through the windings, as will be the case for the present invention by the limitation of currents by the feedback circuits 264 and 266 as discussed above, the acceleration of the rotor will be also be limited by a current limit curve that depends upon the number of turns on the windings. In general, the greater the number of turns, the greater the current limit on the acceleration. Thus, in FIG. 11, the dashed line 282 is the current limited acceleration when currents are passed serially through both the start and run sections of the windings 80A, 82A and 84A and the dashed line 284 is the current limited acceleration when currents are passed through only the run sections of the windings 80A, 82A and 84A. In the practice of the invention, spin up is effected in two stages, corresponding to two consecutive speed ranges, to maximize acceleration throughout the speed range from rest to the operating speed of the disks. More particularly, in the first stage of acceleration, indicated at 286, for low rotor speeds, the acceleration is effected by passing currents serially through both the start and run sections while, in the second stage, indicated at 288, the acceleration is effected by passing currents only through the run sections of the windings. As can be seen in FIG. 11, the transition between the two stages is caused to occur, as will be discussed below with respect to FIG. 9, at the rotor speed at which the run sections alone, operating at the maximum current, produce the same acceleration as the run and start sections operating together in accordance with curve 290. Thus, the acceleration of the disks in accordance with present invention will vary with disk rotation rate in accordance with the curve generally indicated at 290 in FIG. 11. In particular, the acceleration will rise, as shown at 292, to the maximum acceleration achievable by passing the maximum current serially through the start and run sections while the heads are lifted off the disks and such maximum acceleration will then be maintained, as shown at 294, until the rotor speed reaches the back emf limit curve 278. The acceleration will then decrease, as shown at 296, to the maximum current achievable with the run sections alone. At this point, and as will be discussed below, a transition to the second stage is made, to pass current through the run sections alone, so that the acceleration will remain substantially constant, as shown at 298, until the rotor reaches the back emf limit curve 280 corresponding to the maximum acceleration that can be attained at high rotor speeds by passing currents through the run sections alone. The acceleration then decreases as rotor speed increases to the operating speed of the disks, indicated by the dashed line 300, along the portion 302 Of the curve 290. Thus, the acceleration of the disks will be a maximum throughout spin up to minimize the time required for spin up to occur.

Before continuing, it will be useful to consider several practical aspects of the minimization of spin up time in accordance with the present invention in relation to the acceleration limit curves shown in FIG. 11 and described above. In general, the operating characteristics of hard disk drives will vary from one generic type to another but will be substantially the same for drives of a specific type. Thus, the emf and current limited acceleration curves 278, 280, 282 and 284 will be substantially the same for all hard disk drives of a generic type. Thus, generic curves, determined either by calculation from known characteristics of the drive type or from measurements made on a sample of drives of the generic type, can be used to determine both the optimum numbers of turns for the start and run sections of the windings and to establish a convenient measure for the transition point of the two stages of spin up. More particularly, criterion for the optimum number of turns for the run sections is based on the operating speed of the disks during reading and writing of data. Since, as is common in the art, the speed of the rotor will be controlled after spin up by the servo circuit of the hard disk drive, a suitable criterion for selection of the number of turns for the run sections 248, 252 and 256 will be a number that will yield a maximum back emf limited rotor speed approximately five percent larger than the operating speed of the disks. Once such number has been selected, the number of turns for the start windings is selected on the basis of the generic curves corresponding to the curve 290 in FIG. 11. Specifically, the number of turns for the start windings is chosen to maximize the area under the curve 290. The speed for which the generic curves corresponding to the curves 278 and 284 intersect then provides a convenient measure of the point at which the transition between the two modes of operation of the motor circuit is to be made and such selection will result in the transition occurring at substantially the speed at which the emf limited acceleration, using both sections of the windings, becomes equal to the current limited acceleration, using the run section alone, for all drives of the generic type.

Figure 9:
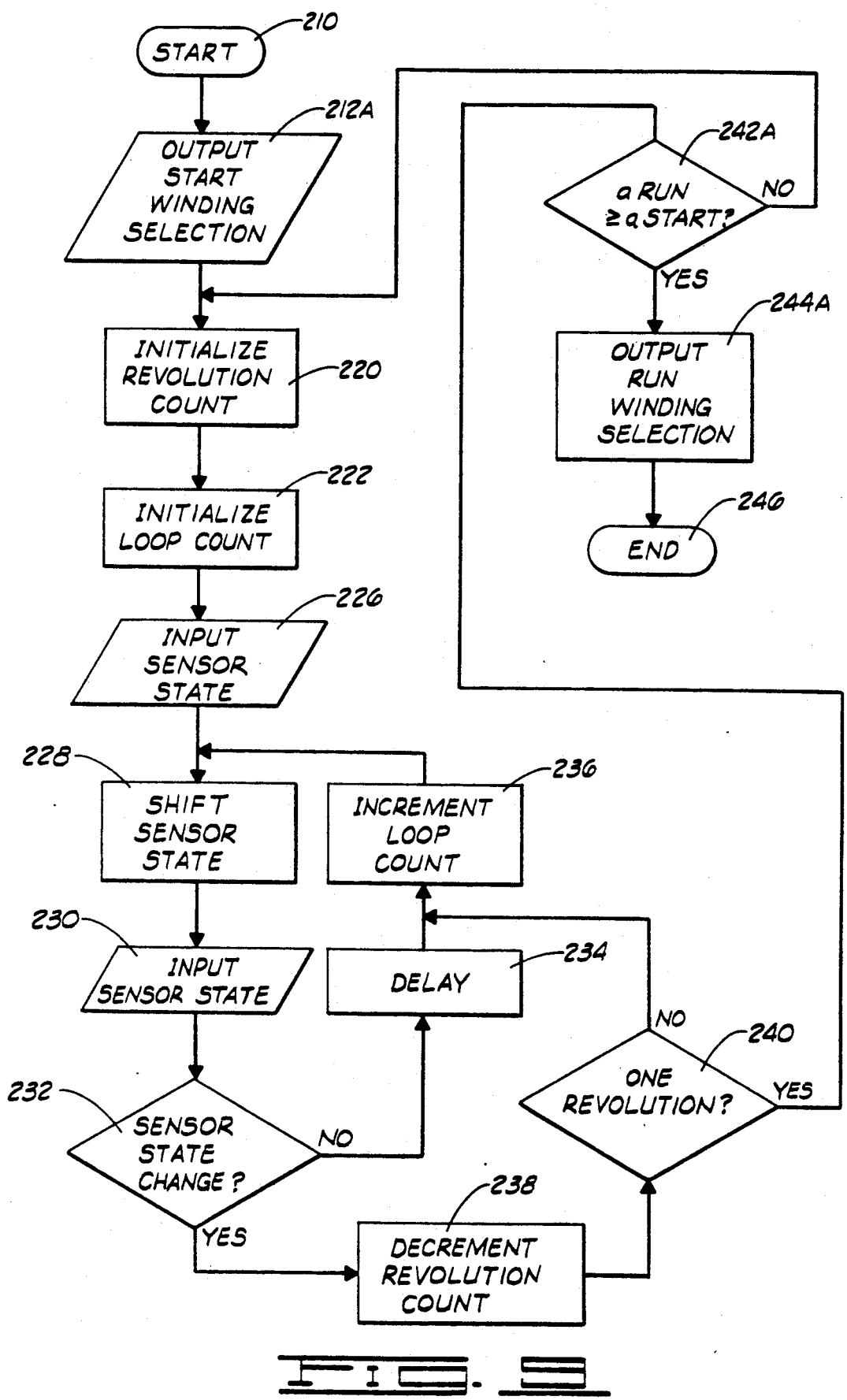
FIG. 9 is a flow chart illustrating the operation of the hard disk drive of the present invention during spin up.

FIG. 9 is a flow chart which illustrates the programming of the microcomputer 104 to effect disk spin up in accordance with the present invention so as to minimize spin up time as described above with respect to FIG. 11. As noted above, one of the advantages of the present invention is the ease with which it can be implemented, such ease stemming from the use of circuit components found in the prior art hard disk drive. This advantage is exploited even further in the programming of the microcomputer 104. More particularly, the same program may be used with only a change in the loop count number at which the code outputted to the latch 214 is to be changed from 11 to 10. Instead of selecting such number to be the number of loop times that correspond to the time required for the rotor to turn through one revolution at the speed at which the heads lift from the disks, such number is selected to correspond to the time required for the disks to turn through one revolution at the speed at which the acceleration achievable by passing the maximum allowable current through the run sections alone is the same as the maximum back emf limited acceleration achievable by passing currents serially through the start and run sections of the windings 80A, 82A and 84A. Thus, the program for effecting spin up using the motor circuit 106A differs from the program illustrated in FIG. 7 in only three blocks and, further, in two such blocks, the difference is only one of interpretation. Thus, it will not be necessary to discuss the flow chart, shown in FIG. 9, for operation of the hard disk drive of the present invention in detail. Rather, program blocks in FIG. 9 which are the same as the program blocks in FIG. 7 have been provided with the same numerical designations as in FIG. 7 with the three exceptions indicated by appending the letter A to such designations. Two of the exceptions are at output blocks 212A and 244A for which the codes 11 and 10 outputted to the latch 214 are, for FIG. 9, mode selection codes. Thus, in the block 212A, the code 11 outputted to the latch 214 will place the motor circuit 106A in the first mode as described above wherein the first drive circuit 108A is enabled to pass currents serially through both the start and run sections of the windings 80A, 82A and 84A; in the block 244A, the code 10 outputted to the latch 214 will place the motor circuit 106A in the second mode as described above wherein the second drive circuit 108B is enabled to pass currents only through the run sections of the windings 80A, 82A and 84A. The final exception is the decision block 242A in which the decision made in such block is whether the acceleration at maximum current using the run sections alone is greater than or equal to the acceleration achievable under back emf limited acceleration in the first mode of operation of the motor circuit 106A. Such decision requires only that the decision be made for a loop count corresponding to the time required for the rotor to undergo one revolution at the speed at which the curves 278 and 284 in FIG. 11 intersect.

DESCRIPTION OF FIG. 10

Figure 10:
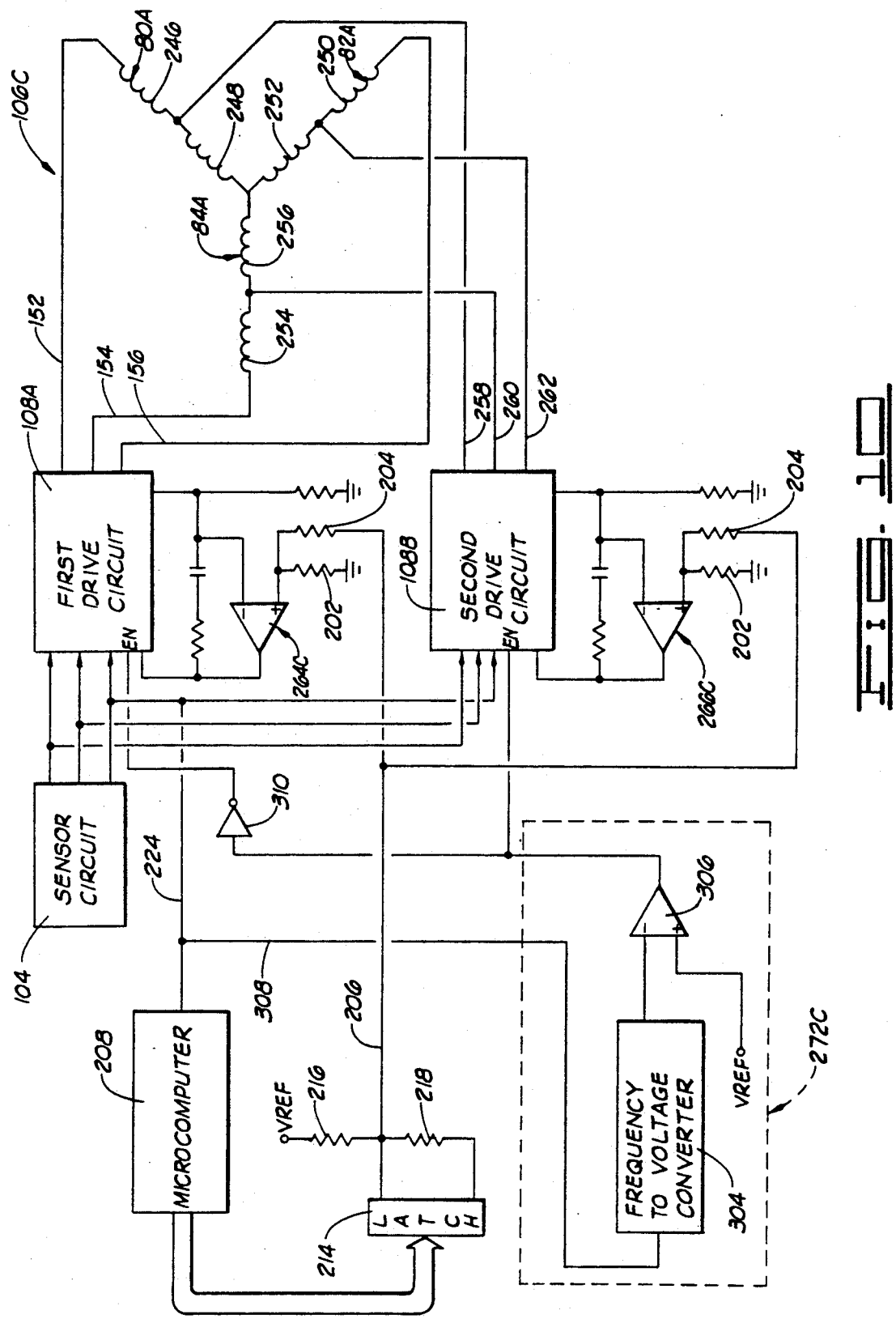
FIG. 10 is a schematic diagram of the motor circuit of a second embodiment of a hard disk drive constructed in accordance with the present invention.

FIG. 10 illustrates a second embodiment of the motor circuit, designated 106C, of a hard disk drive constructed in accordance with the present invention. The circuit 106B differs from the circuit 106A in only a few respects so that it will not be necessary to discuss the construction and operation of the circuit 106B in detail. Rather, components of the circuit 106C that are the same as components of the circuit 106A have been given the same numerical designations as in FIG. 8 and need not be further discussed. Such components operate in the same way that has been discussed above with respect to FIG. 8 and for the same purposes. Thus, only the differences between FIGS. 8 and 10 need be considered.

As in the motor circuit 106A, the two drive circuits 108A and 108B of the motor circuit 106C are alternatively enabled to alternatively effect the first and second modes of operation of the motor circuit 106C wherein currents are passed serially through the start and run sections of the windings 80A, 82A, and 84A for the first mode and through only the run sections in the second mode. However, the microcomputer 208 is not used in effecting these two modes of operation. Rather, the microcomputer 208 is used only to determine when the disks have reached operating speed, as described above for the prior art hard disk drive, and to set the current that will be passed through the winding sections during spin up of the disks. To this latter end, the microcomputer outputs the binary code 11 to the latch 214 throughout spin up and the feedback circuits, designated 264C and 266C in FIG. 10 include resistors 202 and 204 having the same values for both feedback circuits so that the same winding current is called for from both drive circuits 108A and 108B. Such current is the maximum current allowed by the host computer with which the hard disk drive incorporating the circuit 106C is used.

The transition between the two modes of operation is then effected by a mode selection circuit 272C that is comprised of a conventional frequency to voltage converter 304 and a comparator 306. The frequency to voltage converter 304 receives one phase of the sensor signals generated by the sensor circuit 104 as discussed above on a conducting path 308 and the aforementioned conducting path 224 and provides an output to the inverting input of the comparator 306 that is directly proportional to the frequency of square waves that the sensor circuit will generate as the rotor turns; that is, to the rotation rate of the rotor. The noninverting input of the comparator 306 is supplied a reference voltage that is selected to be equal to the output voltage of converter 304 when the disc rotation rate is that for which the curves 278 and 284 in FIG. 11 intersect; that is, the rotation rate for which a transition from the first mode of operation of the motor circuit 106C to the second mode of operation will result in a minimum spin up time for the disks. The output of the comparator 306 will thus be high for low disk rotation rates for which the first mode of operation is desirable and high at rotation rates for which the second mode of operation is desirable for minimum spin up time. Such output is transmitted to the enable terminal of the first drive circuit 108A; that is, the enable terminal of the demux 110 of which the first drive circuit 108A is comprised, through an inverter 310 to constitute a first mode selection signal by grounding the enable terminal of the first drive circuit 108A and is transmitted directly to the enable terminal of the second drive circuit 108B to disable the second drive circuit 108B. Thus, at low disk rotation rates, the motor circuit 106C will be placed in the first mode of operation in which the first drive circuit 108A passes currents serially through the start and run sections of the windings 80A, 82A, and 84A. At higher rotation rates, the output of the comparator 306 goes low to transmit a second mode selection signal to the second drive circuit 108B, by grounding the enable terminal of the demux such circuit contains, while disabling the first drive circuit 108A via a high voltage signal that appears at the output of the inverter 310 when the output of the comparator 306 goes low. Thus, when the rotation rate of the disks reaches the value corresponding to the intersection of the curves 278 and 284 in FIG. 11, the motor circuit is placed into the second mode of operation thereof to cause the second drive circuit 108B to pass currents through only the run sections of the windings 80A, 82A and 84A, for the remainder of the spin up operation of the disks 22 and 24.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a hard disk drive of the type comprising:
a plurality of data storage disks; and
an electronically commutated dc motor for rotating the disks so that data can be magnetically written to and subsequently read from the disks via transducer heads adjacent the disks, the motor comprising:
a stator whereon are wound a plurality of windings;
a rotor, whereon the data storage disks are mounted, magnetically coupled to the rotor for rotation of the disks at a preselected operating speed;
sensor means, coupled to the rotor, for generating sensor signals indicative of the orientation of the rotor, whereby the sensor signals will vary periodically in relation to rotor speed; and
current limited drive means connected between the sensor means and the stator windings for passing currents through windings selected in relation to rotor orientation so as to drive the rotor in a selected direction of rotation,
the improvement wherein each winding of the motor is comprised of serially connected start and run sections; wherein the drive means is further characterized as operable in a first mode in response to a first mode selection signal and a second mode in response to a second mode selection signal; wherein the drive means is connected to the windings to pass currents serially through the start and run sections in the first mode of operation and to pass currents through only the run sections in the second mode of operation; and wherein the motor further comprises mode selection means electrically connected to the sensor means for measuring the speed of rotation of the rotor and electrically connected to the drive means for providing the first mode selection signal to the drive means at such times that the speed of rotation of the rotor is less than a preselected value and for providing the second mode selection signal to the drive means at such times that the speed of rotation of the rotor is greater than said preselected value.

2. The hard disk drive of claim 1 wherein the sensor means is further characterized as a means for generating a plurality of sensor signals at one of two voltage levels determined for each sensor signal by the present orientation of the rotor, whereby the sensor provides a plurality of square waves as the rotor turns; and wherein the mode selection means comprises a microcomputer connected to the sensor means to receive one of said square waves, count the time required for a selected number of pulses of the received square wave to be generated by sensor means and to output a first mode selection code at such times that the time count exceeds a preselected value and to output a second mode selection code at such times that the time count is less than the preselected value; and means connected to the microcomputer for generating the first mode selection signal in response to the first mode selection code and for generating the second mode selection signal in response to the second mode selection code.

3. The hard disk drive of claim 1 wherein the sensor means is further characterized as a means for generating a plurality of sensor signals at one of two voltage levels determined for each sensor signal by the present orientation of the rotor, whereby the sensor means generates a plurality of square waves as the rotor turns; and wherein the mode selection means comprises:
a frequency to voltage convertor connected to the sensor means to receive one of the square waves generated thereby and provide an output voltage indicative of the frequency of the received square wave; and
means, connected to the frequency to voltage converter for generating the first mode selection signal at such times that the output voltage of the convertor is less than a preselected level and generating the second mode selection signal at such times that the output voltage of the convertor is greater than said preselected level.

4. The hard disk drive of claim 1 wherein the drive means comprises:
current limited first drive means, connected to the mode selection means to receive the first mode selection signal and connected between the sensor means and the motor windings for passing currents serially through selected start and run sections of the windings in relation to rotor orientation so as to drive the rotor in the selected direction of rotation in response to the first mode selection signal; and
current limited second drive means, connected to the mode selection means to receive the second mode selection signal and connected between the sensor means and the motor windings for passing currents through selected run sections of the windings in relation to rotor orientation so as to drive the rotor in the selected direction of rotation in response to the second mode selection signal.

5. The hard disk drive of claim 4 wherein the sensor means is further characterized as a means for generating a plurality of sensor signals at one of two voltage levels determined for each sensor signal by the present orientation of the rotor, whereby the sensor provides a plurality of square waves as the rotor turns; and wherein the mode selection means comprises a microcomputer connected to the sensor means to receive one of said square waves, count the time required for a selected number of pulses of the received square wave to be generated by sensor means and to output a first mode selection code at such times that the time count exceeds a preselected value and to output a second mode selection code at such times that the time count is less than the preselected value; and means connected to the microcomputer for generating the first mode selection signal in response to the first mode selection code and for generating the second mode selection signal in response to the second mode selection code.

6. The hard disk drive of claim 4 wherein the sensor means is further characterized as a means for generating a plurality of sensor signals at one of two voltage levels determined for each sensor signal by the present orientation of the rotor, whereby the sensor means generates a plurality of square waves as the rotor turns; and wherein the mode selection means comprises:
a frequency to voltage convertor connected to the sensor means to receive one of the square waves generated thereby and provide an output voltage indicative of the frequency of the received square wave; and
means, connected to the frequency to voltage converter for generating the first mode selection signal at such times that the output voltage of the convertor is less than a preselected level and generating the second mode selection signal at such times that the output voltage of the convertor is greater than said preselected level.

7. An electronically commutated dc motor for rotating disks of a hard disk drive comprising:
a rotor whereon the disks are mounted; and
a stator, whereon are wound a plurality of windings, magnetically coupled to the rotor for rotation of the disks via currents supplied to the windings, wherein each winding is comprised of serially connected start and run sections;
sensor means, coupled to the rotor, for generating sensor signals indicative of the orientation of the rotor, whereby the sensor signals will vary periodically in relation to rotor speed;
first drive means connected between the sensor means and the windings for passing currents serially through selected start and run windings in relation to rotor orientation in response to a first mode selection signal so as to drive the rotor in a selected direction of rotation;
second drive means connected between the sensor means and the run sections of the windings for passing currents serially through selected run sections in relation to rotor orientation in response to a second mode selection signal so as to drive the rotor in the selected direction of rotation; and
mode selection means electrically connected to the sensor means, the first drive means, and the second drive means for generating the first mode selection signal at such times that the rotor speed is less than a preselected value and for generating the second mode selection signal at such times that the rotor speed is greater than said preselected value.

8. The hard disk drive of claim 7 wherein the sensor means is further characterized as a means for generating a plurality of sensor signals at one of two voltage levels determined for each sensor signal by the present orientation of the rotor, whereby the sensor provides a plurality of square waves as the rotor turns; and wherein the mode selection means comprises a microcomputer connected to the sensor means to receive one of said square waves, count the time required for a selected number of pulses of the received square wave to be generated by sensor means and to output a first mode selection code at such times that the time count exceeds a preselected value and to output a second mode selection code at such times that the time count is less than the preselected value; and means connected to the microcomputer for generating the first mode selection signal in response to the first mode selection code and for generating the second mode selection signal in response to the second mode selection code.

9. The hard disk drive of claim 7 wherein the sensor means is further characterized as a means for generating a plurality of sensor signals at one of two voltage levels determined for each sensor signal by the present orientation of the rotor, whereby the sensor means generates a plurality of square waves as the rotor turns; and wherein the mode selection means comprises:
a frequency to voltage convertor connected to the sensor means to receive one of the square waves generated thereby and provide an output voltage indicative of the frequency of the received square wave; and
means, connected to the frequency to voltage converter for generating the first mode selection signal at such times that the output voltage of the convertor is less than a preselected level and generating the second mode selection signal at such times that the output voltage of the convertor is greater than said preselected level.

10. A method for operating an electronically commutated dc motor used to rotate data disks of a hard disk drive to minimize the time required to spin up the disks from rest to a selected operating speed without exceeding a maximum current to be delivered to the motor, wherein the motor is comprised of a rotor and a stator having plurality of windings that are selectively energized during operation of the motor to provide a torque on the rotor, comprising the steps of providing each of the windings with a plurality of accessible sections whereby selected portions of the windings comprised of differing numbers of turns can be energized in the operation of the motor; and accelerating the rotor from rest in a succession of acceleration stages corresponding to successively increasing rotor speed ranges, wherein differing portions of the windings are energized in each acceleration stage and wherein the transition between two successive acceleration stages is effected at substantially the rotor speed at which the acceleration in the preceding acceleration stage decreases to the maximum acceleration achievable with the portion of the windings selected for the succeeding acceleration stage at the maximum motor current.

* * * * *